May 2, 1961 C. E. BRANICK 2,982,126
LEAK TESTING DEVICE FOR TUBELESS TIRES
Filed July 7, 1958 2 Sheets-Sheet 1

INVENTOR.
CHARLES E. BRANICK
BY
*Merchant & Merchant*
ATTORNEYS

INVENTOR.
CHARLES E. BRANICK
BY
Merchant & Merchant
ATTORNEYS

United States Patent Office 2,982,126
Patented May 2, 1961

2,982,126

LEAK TESTING DEVICE FOR TUBELESS TIRES

Charles E. Branick, % Branick Mfg. Co., P.O. Box 1937, Fargo, N. Dak.

Filed July 7, 1958, Ser. No. 746,993

2 Claims. (Cl. 73—45.6)

My invention relates to pneumatic tire inspecting devices and more particularly to power operated devices of this character.

More particularly my invention relates to devices for testing of tubeless pneumatic tires for leaks and to novel mechanism for quickly mounting and dismounting of pneumatic tire casings of this type, for such testing.

The primary object of my invention is the provision of novel means whereby a tubeless pneumatic tire may be readily mounted and dismounted in a vertical plane for rotation on a horizontal axis in overlying relationship to a vertically adjustable dip tank, with a minimum of effort and with a minimum of consumption of time and skill.

A further object of my invention is the provision of a device of the class described wherein the tire casing and rim upon which it is mounted is swingable about a vertical axis toward and away from said dip tank.

A further object of my invention is the provision of a device of the class described which may be relatively inexpensively produced, which is rugged and durable in construction, and efficient and accurate.

The above and still further objects of my invention will become apparent from the following detailed specification, appended claims and attached drawings.

Referring to the drawings wherein like characters indicate like parts throughout the several views.

Figure 1:
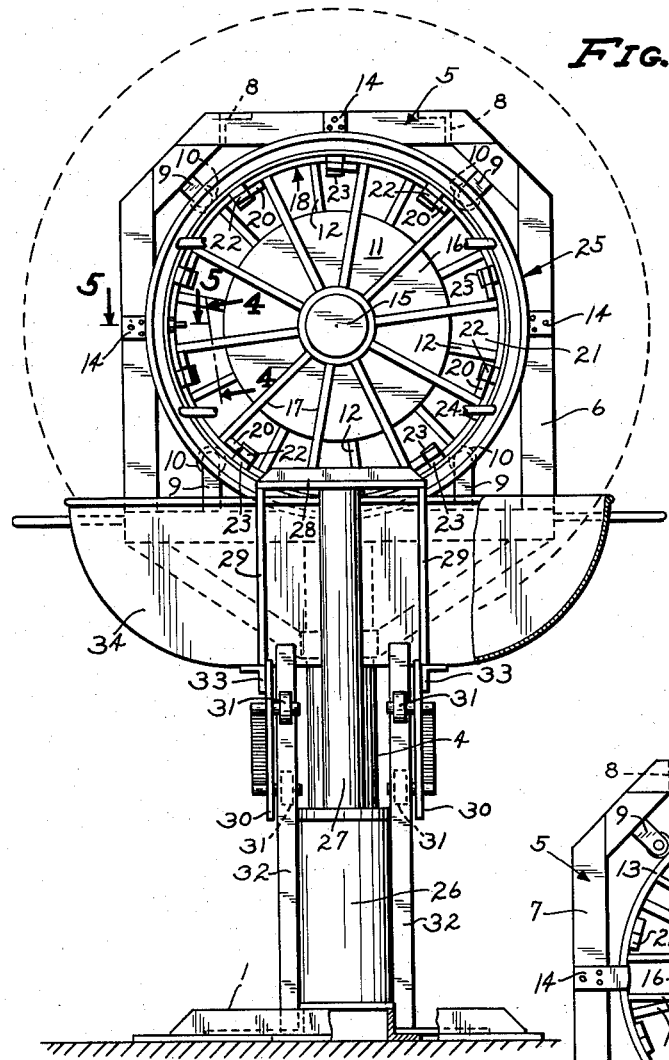
Fig. 1 is a view in front end elevation, some parts being broken away and some parts shown in section.
Figure 6:
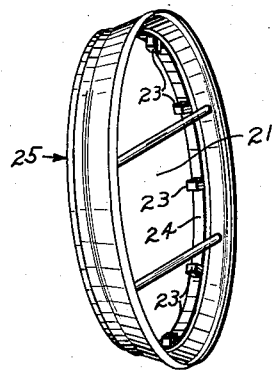
Fig. 6 is a view in perspective of one of the rim sections of my novel structure.
Figure 3:
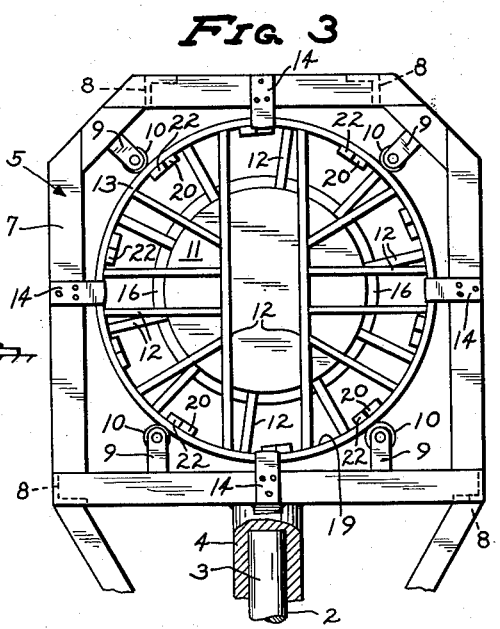
Fig. 3 is an enlarged fragmentary view in rear end elevation of my novel structure.

Referring with greater particularity to the drawings, the numeral 1 indicates a base in the form of a plate formed from suitable metal, such as cast iron or sheet steel. Secured to the base 1 and projecting upwardly therefrom is a standard 2. The reduced upper end 3 of the standard 2 is rotatively received within a downwardly opening socket member 4 upon which, in turn, is mounted for rotation therewith a frame structure, identified in its entirety by the numeral 5. The frame structure 5 includes a pair of spaced generally rectangular front and rear frame members 6 and 7, the upper and lower end portions of which are rigidly connected together by means of transverse connector bars 8. Rigidly secured to each of the frame members 6, 7 and projecting radially inwardly thereof at circumferentially spaced points are mounting brackets 9, each of which has a roller 10 journaled at its radially inner extremity. Each of the rollers 10 associated with a given frame member 6, 7 rotates in a common vertical plane.

Secured between the front and rear frame members 6, 7 is a horizontally disposed cylinder 11. Rigidly secured to opposite end portions of the cylinder 11 and projecting generally radially outwardly therefrom in circumferentially spaced relation are a plurality of spider-forming spokes 12, to the outer ends of which are rigidly secured, as by welding or the like, concentric roller rings 13, one each of which has rolling engagement with the rollers 10 respectively associated with the front and rear frame members 6, 7. In this manner, the cylinder 11 is mounted for rotation on a horizontal axis. Circumferentially spaced radially inwardly projecting ears 14 associated with each of the front and rear frame members 6, 7, engage opposite end portions of the axially spaced roller rings 13 and prevent axial movement of the cylinder 11 with respect to the rollers 10 upon which they are mounted. Mounted within the cylinder 11, but not shown, is a conventional fluid pressure operated piston having a push rod 15 which projects axially outwardly through the head 16 on the forward end of the cylinder 11 for extending and retracting movements, also in a horizontal plane.

Rigidly secured to the forward end of the push rod 15, through the medium of a spider 17, and in concentric relationship thereto, is an annular pneumatic tire mounting rim section 18, particularly designed for tubeless tire casings A.

Figure 4:
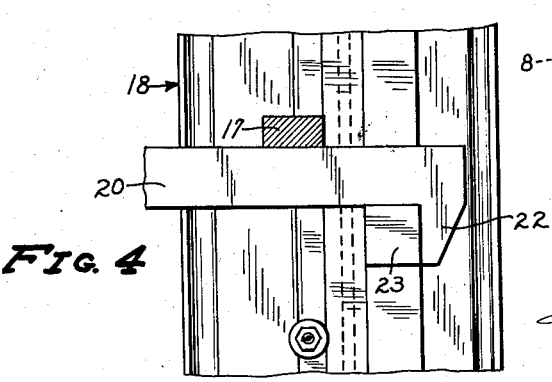
Fig. 4 is an enlarged fragmentary view in elevation as seen from the line 4—4 of Fig. 1.

Rigidly secured, as by welding or the like, to the inner peripheral surfaces 19 of the roller rings 13, so as to be rotatable therewith and with the cylinder 11, are a plurality of circumferentially spaced generally parallel arms 20 which define a generally barrel-shaped structure to slidably receive and guide the annular bead of a tire. The outer ends of these arms project loosely through the opening 21 defined by the annular rim section 18. At their free forward ends, the arms 20 are formed to define hooks 22 which are adapted to have locking engagement with the circumferentially spaced lugs 23 projecting inwardly from the inner peripheral surface 24 of a rim section 25 which complements the rim section 18, as shown particularly in Figs. 2, 4, and 5.

Rigidly secured to the base 1 and projecting vertically therefrom in spaced relation to the standard 2, is a vertical support in the nature of a conventional fluid pressure operated cylinder 26. A push rod 27, connected to a piston, not shown, within the cylinder 26, has a crosshead 28 at its upper end. Depending from opposite ends of the crosshead 28 are lifting arms 29, the lower ends of which are rigidly secured to a carriage 30 which, in turn, is mounted for vertical reciprocation, through the medium of rollers 31 upon laterally spaced vertical rails 32, see particularly Figs. 1 and 2. Operatively secured to and carried by the carriage 30 is a horizontally disposed bracket 33 upon which is normally mounted an upwardly opening fluid containing dip tank 34.

Figures 2, 5:
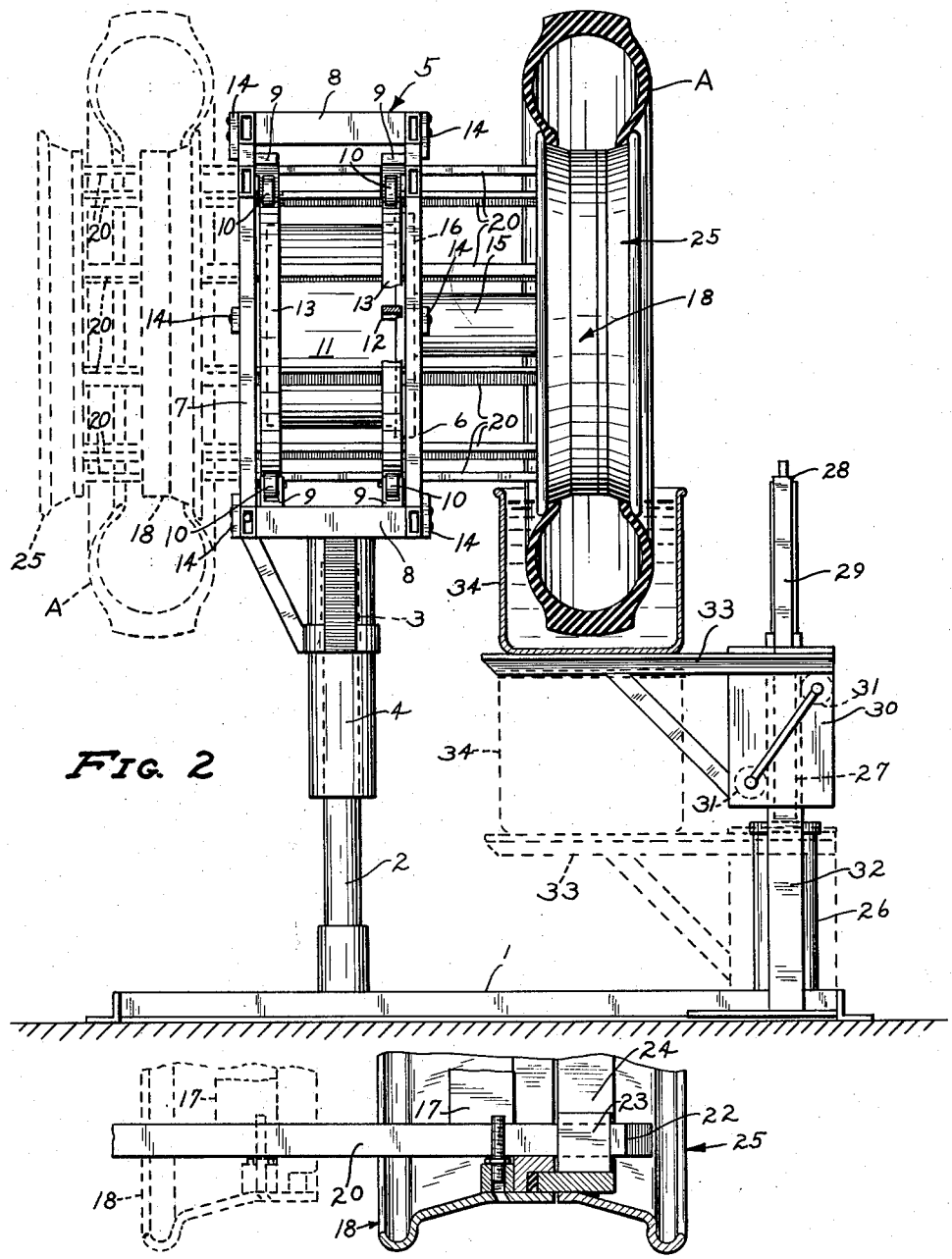
Fig. 2 is a view in side elevation, some parts being broken away and some parts shown in section.
Fig. 5 is an enlarged sectional view as seen substantially from the line 5—5 of Fig. 1.

For the purpose of mounting a tubeless pneumatic tire casing A, one bead portion thereof is positioned upon the annular rim section 18, while the push rod 15 and said rim section 18 is in the retracted dotted line position of Fig. 2. Thereafter, the rim section 25 is placed over the free ends of the arms 20 and hooking engagement is caused between the hooks 22 and the lugs 23 by imparting limited rotary movements to the rim 25 relative to said arms 20. The rim sections 18, 25 are then caused to come into operative engagement with each other as shown by full lines in Fig. 2, by reducing the fluid under pressure into the cylinder 11, through means not shown, whereby to extend the push rod 15 and rim section 18 carried thereby. Preferably, this mounting is done while the frame structure 5 has been rotated to the dotted line position about the axis of the standard 2, so as to avoid coming into contact with the dip tank 34 and parts for imparting vertical adjustments thereto.

After mounting of the tire A as above described, the frame 5 is rotated to the full line showing of Fig. 2 and the dip tank 34 is elevated to a desired position so as to submerge the entire lower end portion of the tire casing A and the bead flanges 35 of the rim sections 18, 25 in the fluid within said dip tank.

My invention has been thoroughly tested and found to be completely satisfactory for the accomplishment of the above objects, and while I have shown a preferred embodiment thereof, I wish it to be specifically understood that same is capable of considerable modification without departure from the scope and spirit of the appended claims.

What I claim is:

1. In a device of the class described, a base, a standard secured to said base, a frame structure carried by said standard and mounted thereon for rotation about a vertical axis, a pair of laterally spaced ring members carried by said frame and journaled for rotation therein on a horizontal axis, a fluid pressure operated piston-cylinder including a push rod mounted within said ring members and concentrically rotatable therewith about the same horizontal axis, an inner annular pneumatic tire mounting rim section carried by the outer end of said push rod in concentric relation thereto and extendable and retractable therewith laterally of said frame, a plurality of circumferentially spaced generally parallel tire bead supporting and guiding arms carried by said ring members and rotatable therewith, said arms extending laterally of said frame and parallel to said horizontal axis through openings in said inner annular rim section and defining hooks at their free ends, an outer annular rim section carried by the outer ends of said arms for cooperation with said inner rim section and having lugs on its inner peripheral surface engageable with the hooks on said arms, a dip tank in laterally spaced relationship to said standard, and means for raising and lowering said dip tank with respect to said tire mounting rim sections.

2. A tire mounting and leak testing device for tubeless tires, comprising two upstanding base members having parallel vertical axes, an elongated open top tank mounted on one of said base members, a frame member rotatably mounted on the other base member for swinging movement about the vertical axis thereof, a barrel-shaped structure rotatably mounted in and projecting laterally from said frame member, an outer annular tire bead engaging rim portion carried at the free end of said barrel-shaped structure in laterally spaced relation to said frame member, a relatively movable inner annular tire bead engaging rim portion surrounding said barrel-shaped structure, power reciprocating means carried by said frame member and connected to said inner rim portion for moving said rim portion between said frame member and said outer rim portion in mounting a tire thereon for registering position with said tank, and other power reciprocating means associated with one of said base members for producing relative movement between said frame member and said elongated tank when a tire is mounted by said rim portions in said latter position.

References Cited in the file of this patent

UNITED STATES PATENTS

| | | |
|---|---|---|
| 1,325,747 | McGrath | Dec. 23, 1919 |
| 2,697,853 | Smyser | Dec. 28, 1954 |
| 2,859,609 | Tomchak | Nov. 11, 1958 |

FOREIGN PATENTS

| | | |
|---|---|---|
| 890,906 | France | Nov. 19, 1943 |